United States Patent
Yoshikawa et al.

(10) Patent No.: US 10,456,731 B2
(45) Date of Patent: Oct. 29, 2019

(54) $CO_2$ CONCENTRATION REDUCING DEVICE

(71) Applicant: HITACHI CHEMICAL COMPANY, LTD., Tokyo (JP)

(72) Inventors: Kohei Yoshikawa, Tokyo (JP); Masato Kaneeda, Tokyo (JP); Hidehiro Nakamura, Tokyo (JP); Toshiaki Shirasaka, Tokyo (JP)

(73) Assignee: HITACHI CHEMICAL COMPANY, LTD., Tokyo (JP)

( * ) Notice: Subject to any disclaimer, the term of this patent is extended or adjusted under 35 U.S.C. 154(b) by 175 days.

(21) Appl. No.: 15/546,814

(22) PCT Filed: Feb. 24, 2016

(86) PCT No.: PCT/JP2016/055383
§ 371 (c)(1),
(2) Date: Jul. 27, 2017

(87) PCT Pub. No.: WO2016/152363
PCT Pub. Date: Sep. 29, 2016

(65) Prior Publication Data
US 2018/0021717 A1 Jan. 25, 2018

(30) Foreign Application Priority Data
Mar. 26, 2015 (JP) ................. 2015-064101

(51) Int. Cl.
*B01D 53/52* (2006.01)
*B01D 53/04* (2006.01)
*B01J 20/06* (2006.01)
*B01D 53/12* (2006.01)
*B01J 20/34* (2006.01)

(52) U.S. Cl.
CPC ......... *B01D 53/0438* (2013.01); *B01D 53/04* (2013.01); *B01D 53/12* (2013.01);
(Continued)

(58) Field of Classification Search
CPC ............... B01D 53/1475; B01D 53/62; B01D 2257/504; Y02C 10/08
(Continued)

(56) References Cited

U.S. PATENT DOCUMENTS 3,907,971 A   9/1975 Bohm et al.
2007/0169624 A1* 7/2007 Saito .................. B01D 53/02
                                           95/139
(Continued)

FOREIGN PATENT DOCUMENTS

EP   2463013 A1 * 6/2012 ............ B01D 53/12
JP   47-010216 A   5/1972
(Continued)

OTHER PUBLICATIONS

International Search Report for WO 2010/100739 A1, dated Mar. 29, 2016.
Liu et al., "Fundamental and practical developments of magnetofluidized beds: a review," Powder Technology, 64, 3-41 (1991).

*Primary Examiner* — Thuan D Dang
(74) *Attorney, Agent, or Firm* — Volpe and Koenig, P.C.

(57) ABSTRACT

Disclosed is a $CO_2$ concentration reducing device for separating and removing $CO_2$ from a gas containing $CO_2$ with a $CO_2$ adsorbent, the $CO_2$ concentration reducing device including: an adsorbent container which contains the $CO_2$ adsorbent; and a heating unit which heats the $CO_2$ adsorbent by an induction heating or a dielectric heating. Thus, a ventilation quantity can be reduced when $CO_2$ accumulated in a room is removed, and an electric power required for the ventilation and the electric power required for air conditioning can be reduced.

9 Claims, 9 Drawing Sheets

(52) U.S. Cl.
CPC ........... *B01J 20/06* (2013.01); *B01J 20/3433* (2013.01); *B01J 20/3483* (2013.01); *B01D 2253/104* (2013.01); *B01D 2253/106* (2013.01); *B01D 2253/1124* (2013.01); *B01D 2255/2065* (2013.01); *B01D 2257/504* (2013.01); *B01D 2258/06* (2013.01); *B01D 2259/40096* (2013.01); *B01D 2259/40098* (2013.01); *B01D 2259/4508* (2013.01); *B01D 2259/4566* (2013.01); *Y02C 10/08* (2013.01)

(58) Field of Classification Search
USPC ...................................... 95/139, 148; 96/146
See application file for complete search history.

(56) References Cited

U.S. PATENT DOCUMENTS

| | | | |
|---|---|---|---|
| 2012/0025134 A1* | 2/2012 | Feng | ................... B01D 53/62 252/184 |
| 2012/0048111 A1 | 3/2012 | Nakao et al. | |
| 2014/0053729 A1 | 2/2014 | Crooks et al. | |

FOREIGN PATENT DOCUMENTS

| | | |
|---|---|---|
| JP | 09-038460 A | 2/1997 |
| JP | 2005-194132 A | 7/2005 |
| JP | 2005-279390 A | 10/2005 |
| JP | 2012-024648 A | 2/2012 |
| JP | 2013-128908 A | 7/2013 |

\* cited by examiner

CO₂ CONCENTRATION REDUCING DEVICE

TECHNICAL FIELD

The present invention relates to a $CO_2$ concentration reducing device.

BACKGROUND ART

A $CO_2$ concentration (carbon dioxide concentration) in a room tends to rise by human breathing in a highly populated space such as a building or a vehicle. It is known that sleepiness is induced when a $CO_2$ concentration exceeds 1,000 ppm. Consequently, a $CO_2$ concentration is regulated by taking in the outside air so that a $CO_2$ concentration may not exceed 1,000 ppm in a building or the like. A blast machine such as a blower has to be operated in order to take in the outside air quickly and hence ventilation electric power is required. Further, the temperature and humidity of air taken in from outside are not adjusted and air cooling has to be applied in a summer season and air heating has to be applied in a winter season. Consequently, the rise of a $CO_2$ concentration in a room is the main cause of the increase of ventilation electric power and power consumption in air conditioning including cooling and heating. A $CO_2$ decrement in a room caused by ventilation can be calculated through the following calculation expression.

{(Indoor $CO_2$ concentration)−(Outdoor $CO_2$ concentration)}×(Ventilation quantity)=($CO_2$ decrement by ventilation)

If a $CO_2$ decrement on the right side of the expression is equal to a $CO_2$ increment caused by human breathing, a $CO_2$ concentration can be kept constant.

When attention is focused on the removal of $CO_2$ from indoor air by using an adsorbent, in Patent Document 1, for example, described is a $CO_2$ removal device using a rotor coated with an $H_2O$ and $CO_2$ adsorbent. The device has a configuration of adsorbing $CO_2$ at room temperature and successively desorbing $CO_2$ by circulating a heated gas and heating a $CO_2$ adsorbent.

A carbon dioxide capturing material described in Patent Document 2: is developed by the present inventors; and is a substance that includes a porous body containing a cerium oxide having a peak pore size of 1.5 to 10 nm in a pore volume distribution and captures and separates carbon dioxide from a gas containing carbon dioxide. Here, the porous body desirably includes Sm, La, and the like.

In Patent Document 3, described is a technology of: configuring a part of a filter including an adsorbent to adsorb moisture and organic gases including smell in the air by a material compatible with an electromagnetic induction heating; installing a magnetic field generator such as a magnet coil in the vicinity of the filter; self-heating the filter by a magnetic field; and desorbing the moisture and the organic gases from the adsorbent.

PRIOR ART DOCUMENTS

Patent Documents

Patent Document 1: International Patent Publication No. WO 2010/100739
Patent Document 2: Japanese Patent Application Laid-Open No. 2012-24648
Patent Document 3: Japanese Patent Application Laid-Open No. 2005-279390

SUMMARY OF THE INVENTION

Problem to be Solved by the Invention

In recent years, an outdoor $CO_2$ concentration (about 400 ppm at the time of 2013) increases and hence a CO2 concentration difference from a room interior reduces. Consequently, a ventilation quantity required for adjusting the $CO_2$ concentration also increases. When an outdoor $CO_2$ concentration increases further in future, power consumption is thought to increase in the adjustment of a $CO_2$ concentration by ventilation.

If $CO_2$ can be reduced selectively by using a method other than ventilation, the ventilation quantity can be reduced and resultantly ventilation electric power and air conditioning electric power may possibly be reduced.

In the device described in Patent Document 1, indoor air is used as a medium of heating an adsorbent for $CO_2$ desorption. On this occasion, the indoor air that is a heating medium has to be exhausted outdoors. Since outside air of the same quantity as the exhausted gas has to be taken in, the ventilation is resultantly required for heating the adsorbent and desorbing $CO_2$.

The carbon dioxide capturing material described in Patent Document 2 has an excellent adsorption characteristic but requires a heating means for efficient regeneration.

The technology described in Patent Document 3 is convincing on the point that the electromagnetic induction heating is used but the target of desorption is moisture and organic gases such as smell and is not applied to the desorption of carbon dioxide.

An object of present invention is to: reduce a ventilation quantity when $CO_2$ accumulated in a room is removed; and reduce electric power required for the ventilation and the electric power required for air conditioning.

Means for Solving the Problem

A $CO_2$ concentration reducing device of the present invention is for separating and removing $CO_2$ from a gas containing $CO_2$ with a $CO_2$ adsorbent. The $CO_2$ concentration reducing device includes: an adsorbent container which contains the $CO_2$ adsorbent; and a heating unit which heats the $CO_2$ adsorbent by an induction heating or a dielectric heating.

Effect of the Invention

The present invention makes it possible to: reduce a ventilation quantity when $CO_2$ accumulated in a room is removed; and reduce the electric power required for the ventilation and the electric power required for air conditioning.

MODE FOR CARRYING OUT THE INVENTION

Figure 1:
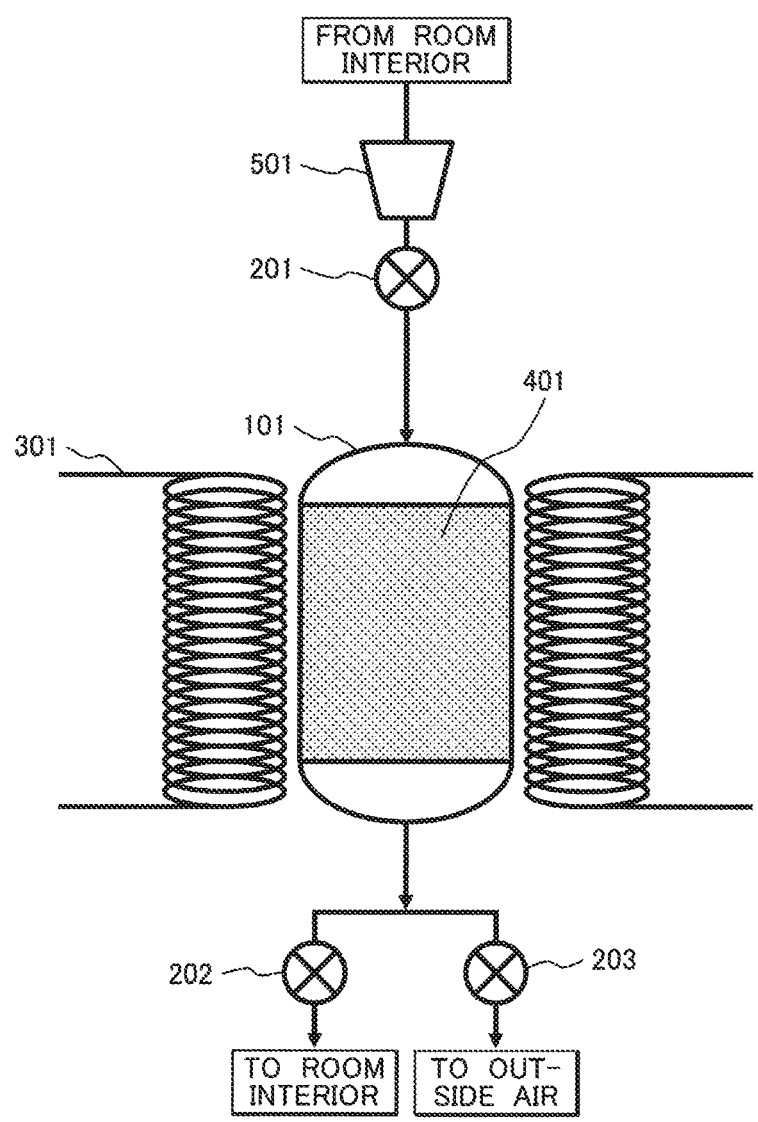
FIG. 1 a schematic configuration diagram showing a $CO_2$ concentration reducing device according to the present invention.

The present invention relates to: a device to reduce ventilation electric power and air conditioning electric power by reducing a ventilation quantity in a building, a vehicle, or the like; and in particular a device to reduce an indoor $CO_2$ concentration while electric power is saved.

Embodiments according to the present invention are explained hereunder. Here, the scope of the present invention is not limited to the examples exhibited below.

The present inventors, as a result of earnestly studying the above problem, have found that it is possible to reduce power consumption required for $CO_2$ concentration reduction by using a $CO_2$ concentration reducing device for separating and removing $CO_2$ from a gas containing $CO_2$ with a solid $CO_2$ adsorbent, wherein the $CO_2$ adsorbent contains cerium oxide or cerium composite oxide and a device to heat the $CO_2$ adsorbent has a device using an induction heating or a dielectric heating. Here, the cerium composite oxide means a material produced by adding Na, Mg, Y, La, Sm, or another as a second component to cerium oxide and has an excellent adsorption characteristic as described in Patent Document 2.

In the device, since a heating medium is an alternating current magnetic field (alternating magnetic field) or an alternating current electric field (alternating electric field), a heating gas used when $CO_2$ is heated and desorbed is not required to be circulated or required in very low amounts. As a result, it is possible to reduce pressure loss in circulating a gas into a $CO_2$ adsorbent, a heat capacity of a gas itself that is the heat medium, and ventilation electric power accompanying the exhaust of the gas.

Further, it is possible to adsorb $CO_2$ even under the existence of moisture by using cerium oxide or cerium composite oxide as a $CO_2$ adsorbent. The characteristic is suitable for applications of removing $CO_2$ from a gas containing moisture, such as human breathing or the atmosphere. As an operation example of the device, exemplified is a method of regenerating the $CO_2$ adsorbent by: circulating a gas containing $CO_2$ into the $CO_2$ adsorbent and adsorbing and removing $CO_2$; returning a $CO_2$-removed gas into a room; and after $CO_2$ is adsorbed, desorbing $CO_2$ by heating the adsorbent by the induction heating or the like.

One of the advantages of using the induction heating or the dielectric heating is that heating is not limited by a heat transfer rate. When an adsorbent is heated from an exterior with a heating device such as a heater, the whole adsorbent has to be heated by heat transfer. A heat transfer rate is proportional to a temperature gradient. When an adsorbent volume is large in particular, a temperature gradient is moderate, a heat transfer rate is low, moreover a heat requirement increases, and hence a heating rate lowers. The induction heating and the dielectric heating do not depend on a temperature gradient and hence can respond easily even when an adsorbent volume increases.

For heating the $CO_2$ adsorbent, either of the induction heating or the dielectric heating may be used. As a configuration of heating the $CO_2$ adsorbent by the induction heating, exemplified is a method of circulating alternating electric current into a device to generate an alternating current magnetic field, for example, a conductive wire wound into a coil, as a heating device. Only the generation of eddy current in a magnetic field is required for generating heat by the induction heating and a conductor such as a metal is named as a used heating element material (hereunder referred to as an "induction heating element"). Further, when a magnetic body is used, hysteresis heating caused by an alternating current magnetic field is generated and hence heating efficiency can be increased further. As magnetic bodies, iron, chromium, cobalt, an alloy and a compound of them are named, for example.

The shape of the induction heating element may be any shape and various shapes such as a columnar shape, a tabular shape, a pulverized shape, a honeycomb shape, and a netlike shape are named.

In the case of a columnar shape, for example, a configuration of installing a columnar induction heating element in an adsorbent container and successively stuffing a pulverized $CO_2$ adsorbent is conceivable. In the configuration, the induction heating element is not required to touch the container and it is not necessary to penetrate a heat-transfer tube outside a container in order to introduce a fluid into the heat-transfer tube like the case of installing an ordinary heat-transfer tube in the interior of a container, for example.

When a pulverized induction heating element is used, a method of mixing a pulverized $CO_2$ adsorbent with a pulverized induction heating element beforehand and successively using them by granularly forming them is conceivable. By this method, formed grains themselves constitute a heating element and hence spacially uniform heating is likely to be obtained. As other methods, a method of supporting mixed powder of a $CO_2$ adsorbent and an induction heating element with a honeycomb or the like, a method of supporting a pulverized induction heating element with a $CO_2$ adsorbent formed into a honeycomb shape, and a method of supporting a pulverized $CO_2$ adsorbent with an induction heating element of a honeycomb shape are conceivable.

A binder may be used for promoting the mixture and contact between an induction heating element and a $CO_2$ adsorbent. As a binder, ether an organic binder or an inorganic binder may be used but an inorganic binder is desirable because the $CO_2$ adsorbent is heated for desorbing $CO_2$ and as examples silicon compounds and aluminum compounds such as boehmite, an alumina sol, and a silica sol are named.

When dielectric heating is used for heating the $CO_2$ adsorbent, the $CO_2$ adsorbent itself may be used as a dielectric body. When an adsorption gas contains moisture, the moisture adsorbed and condensed in the $CO_2$ adsorbent functions as a dielectric body and energy is likely to be used for heating the moisture. Consequently, when the amount of moisture is large, a heating rate increases and a spacial distribution of a $CO_2$ adsorbent temperature is biased. Since the heating rate of the $CO_2$ adsorbent lowers after moisture has desorbed or evaporated, this method can be used as a method for heating the $CO_2$ adsorbent to a temperature at which water desorbs or evaporates under the conditions.

A heating device for induction heating or dielectric heating may be installed either inside an adsorbent container or outside a container. As a configuration of installing a heating device for induction heating outside a container, for example, a method of forming an adsorbent container with a non-magnetic body or a non-metal and stuffing a $CO_2$ adsorbent and an induction heating element in the interior of the container is conceivable. As a device to generate an alternating current magnetic field, only to apply alternating current to a coiled conductive wire is required and a method of installing a conductive wire outside an adsorbent container is conceivable. The configuration has the features of compacting the configuration of the interior of an adsorbent container and simplifying the stuffing of the $CO_2$ adsorbent and the induction heating element. As another configuration, for example, a container itself may be formed of an induction heating element such as a magnetic body, the adsorbent container itself may be heated, and the heat may be transferred to the $CO_2$ adsorbent.

A part or the whole of a heating device for induction heating or dielectric heating may be movable. As a configuration in which a heating device for induction heating is movable, for example, a configuration of forming an adsorbent container with a non-magnetic body or a non-metal, stuffing a $CO_2$ adsorbent and an induction heating element into the container, installing a movable coiled conductive wire outside the adsorbent container, and supplying alternating current to the conductive wire is conceivable. When this configuration is used, it is possible to heat an arbitrary place in the adsorbent container by changing the position of the coil. Here, when it is estimated, for example, that an induction heating element is heated locally by this configuration, a material is sintered by a high temperature, and degradation is caused, it is possible to change the heating position of an adsorbent and inhibit the degradation by changing the position of a coil before it comes to be a high temperature.

A gas may be circulated into the $CO_2$ adsorbent in a process of heating the $CO_2$ adsorbent. The circulation gas may be any gas but the air in a room, outside air, water vapor, and a mixed gas of those are named in particular from easiness in handling. As the configuration, for example, a configuration of forming an adsorbent container with a non-magnetic body or a non-metal, stuffing the $CO_2$ adsorbent and the induction heating element into the container, installing a movable coiled conductive wire outside the adsorbent container, and further installing a blower to circulate indoor air into the $CO_2$ adsorbent is named.

As a method of using a $CO_2$ removal device of this configuration, the following method is conceivable.

After $CO_2$ is adsorbed by circulating indoor air, a part of a $CO_2$ adsorbent (referred to as a part A of adsorbent) is heated to a prescribed temperature (referred to as temperature T) by induction heating and $CO_2$ is desorbed. Successively, by circulating the indoor air, a sensible heat in the part A of adsorbent is transported to a not-heated part of the $CO_2$ adsorbent (referred to as a part B of adsorbent). The part B of adsorbent is heated by the heat transport. Successively, after a movable coiled conductive wire is shifted to a vicinity of the part B of adsorbent, the part B of adsorbent is heated by induction heating. A heat quantity required for heating the part B of adsorbent to the temperature T reduces by the heat transport from the part A of adsorbent. Moreover, since the part A of adsorbent is cooled by the heat transport, time and an air quantity required for cooling the $CO_2$ adsorbent in order to adsorb $CO_2$ again can be reduced.

As a method of adsorbing and separating $CO_2$, a fixed bed method of fixing and using an adsorbent or a fluidized bed method of circulating and using an adsorbent are named and either of the methods may be used.

When a $CO_2$ concentration reducing device of a fluidized bed method is used, either a gas such as air may be used for transporting a $CO_2$ adsorbent or a mixed material of the $CO_2$ adsorbent and a magnetic body may be used and the mixed material may be transported by a magnetic force.

Further, in general when a solid material is circulated, the pulverization of the material caused by collision among the material and the scatter of the material accompanying the pulverization are concerned. In such a device, dust collection is applied with a filter or the like so as not to scatter the material into the atmosphere. To cope with the problem, it is thought to be possible to increase the collection capability of adsorbent powder and inhibit the material from scattering into the atmosphere by using a mixed material of the $CO_2$ adsorbent and the magnetic body and applying a magnetic force to a filter.

Examples according to the present invention are hereunder explained in detail.

EXAMPLE 1

FIG. 1 shows a configuration example for reducing a $CO_2$ concentration in indoor air by a fixed-bed method using a $CO_2$ adsorbent.

A $CO_2$ concentration reducing device shown in FIG. 1 includes an adsorbent container 101, flow control valves 201 to 203, a magnetic field generating unit for induction heating 301 having coiled conductive wires, mixed particles 401 of a $CO_2$ adsorbent including a cerium oxide and a magnetic body, and a blower 501. A material of a non-magnetic body or a non-metal such as ceramics or an organic substance is desirably used for the adsorbent container 101.

In a method for operating the device, the processes of adsorption, heating, and cooling are repeated. A $CO_2$ adsorbent temperature during adsorption is set at 30° C. and the $CO_2$ adsorbent temperature during desorption is set at 200° C.

Firstly, the flow control valves 201 and 202 are opened and the flow control valve 203 is closed. Indoor air is introduced into the adsorbent container 101 with the blower 501, $CO_2$ is adsorbed and removed, and a gas from which $CO_2$ is removed is returned to a room interior.

When $CO_2$ is desorbed and discharged to the atmosphere after $CO_2$ is adsorbed sufficiently, the flow control valves 201 and 202 are closed and the flow control valve 203 is opened, the mixed particles 401 are heated by the magnetic field generating unit for induction heating 301, and $CO_2$ is desorbed and discharged to the atmosphere. Successively, during cooling, the flow control valves 201 and 202 are opened and the flow control valve 203 is closed, indoor air is introduced into the adsorbent container 101 with the blower 501, and the mixed particles 401 are cooled.

Trial Calculation of Power Consumption

An electric power consumed when $CO_2$ is selectively removed by using a $CO_2$ adsorbent is calculated on trial by the following method. The power consumption is calculated through the following computational expression.

(Power consumption)=(Heat requirement)/(Conversion efficiency from electric power to heat)

A heat requirement is calculated as the sum of a heat applied to the $CO_2$ adsorbent and a $CO_2$ desorption heat. Physical property values used for the trial calculation are shown in Table 1.

The energy for reducing a $CO_2$ concentration derived from the physical property values in the table is 8.1 kJ/g-$CO_2$.

TABLE 1

Physical property values in using adsorbent method

| Items | Values |
| --- | --- |
| Adsorbed $CO_2$ quantity (mol/kg) | 0.3 |
| $CO_2$ adsorbent specific heat (kJ/kgK) | 0.4 |
| $CO_2$ adsorption heat (kJ/mol) | 60 |
| Adsorption temperature (° C.) | 30 |
| Desorption temperature (° C.) | 200 |
| Conversion efficiency from electric power to heat (%) | 80 |

COMPARATIVE EXAMPLE 1

An electric power required when a $CO_2$ concentration is adjusted by ventilation, particularly a power consumption required for cooling, is calculated on trial by the following method.

Firstly, an enthalpy difference between outside air and indoor air is calculated and a quotient obtained by dividing the difference by a performance factor is regarded as a power consumption. Here, the enthalpy of air is calculated on the basis of an air temperature of 25° C. and, with regard to water and water vapor, the enthalpy is calculated on the basis of condensed water of 25° C. The variations of the specific heat and the density of air caused by a $CO_2$ concentration are regarded as minute and thus disregarded. The outside air is regarded as 30° C., a relative density of 70%, and a $CO_2$ concentration of 400 ppm and indoor air is regarded as 28° C., a relative humidity of 50%, and a $CO_2$ concentration of 1,000 ppm.

With regard to each of the gases in the respective states, a $CO_2$ quantity and an enthalpy per dry air 1 kg are shown in Table 2.

The enthalpy difference is 19.1 kJ and the $CO_2$ content difference is 0.91 g between the outside air and the indoor air. The performance factor in this cooling is assumed to be 2.0 and an electric power required for reducing a $CO_2$ concentration by ventilation is calculated through the following expression.

(Power consumption)=(Enthalpy difference)/{($CO_2$ content difference)×(Performance factor)}

As a result of the trial calculation through the expression, the electric power required for reducing a $CO_2$ concentration is 10.5 kJ/g-$CO_2$

TABLE 2

Physical properties of outside air and indoor air

| Items | Outside air | Indoor air |
| --- | --- | --- |
| Temperature (° C.) | 30 | 28 |
| Relative humidity (%) | 70 | 50 |
| $CO_2$ concentration (ppm) | 400 | 1000 |
| $CO_2$ content (g/Nm$^3$) | 0.79 | 1.96 |
| Air density (kg/Nm$^3$) | 1.293 | 1.293 |
| $CO_2$ content (g/kg-Air) | 0.61 | 1.52 |
| Water vapor quantity (g/kg-Air) | 19.0 | 12.0 |
| Condensed water quantity (g/kg-Air) | 0 | 7.0 |
| Total enthalpy (kJ/kg-Air) | 51.8 | 32.7 |

Figure 2:
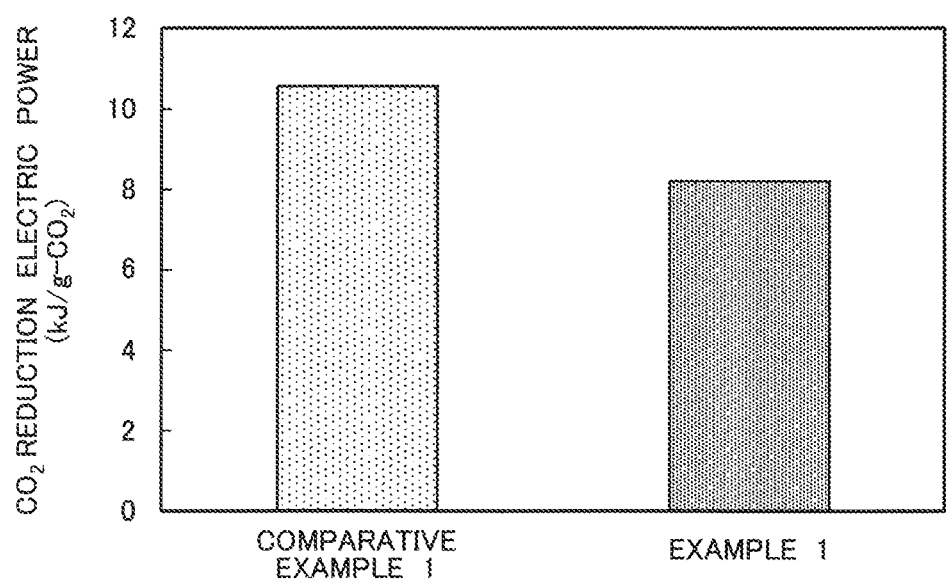
FIG. 2 is a graph comparatively showing power consumption between a $CO_2$ concentration reducing device according to Example 1 and a conventional ventilation method (Comparative Example 1).

Electric powers required for reducing a $CO_2$ concentration by an adsorbent method and by conventional ventilation are shown in FIG. 2.

From FIG. 2, it is obvious that, in comparison with Comparative Example 1, the $CO_2$ reduction electric power can be lowered and the electric power is saved by the adsorbent method according to Example 1.

COMPARATIVE EXAMPLE 2

Figure 3:
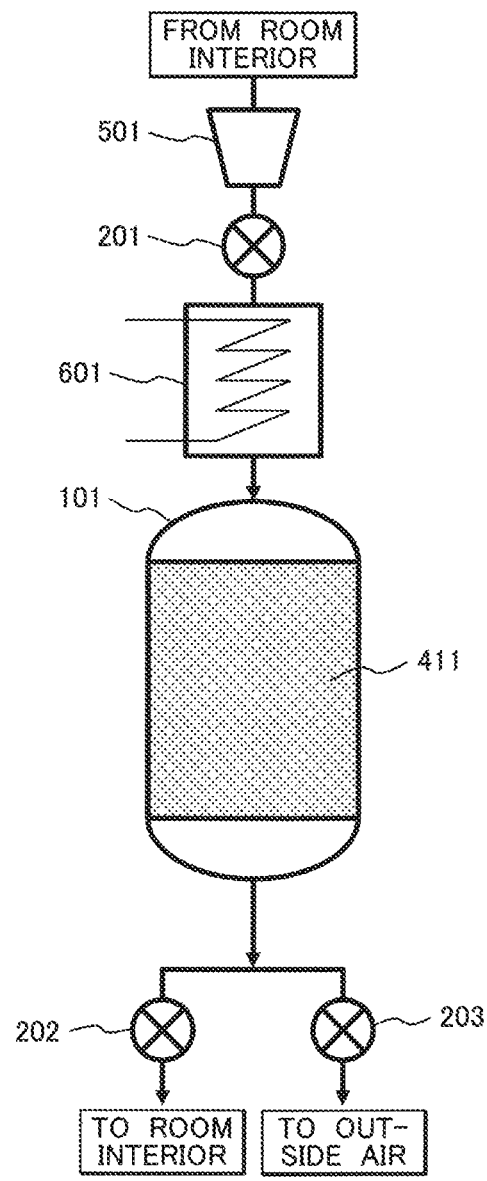
FIG. 3 is a schematic configuration diagram showing an example (Comparative Example 2) of a $CO_2$ concentration reducing device of heating a $CO_2$ adsorbent by heated air.

FIG. 3 shows a configuration example for reducing a $CO_2$ concentration in indoor air by a fixed-bed method using a $CO_2$ adsorbent.

In FIG. 3, a $CO_2$ concentration reducing device includes an adsorbent container 101, flow control valves 201 to 203, a $CO_2$ adsorbent 411 including a cerium oxide, a blower 501, and a heater 601 for heating a gas.

In a method for operating the device, the heater 601 for heating a gas is used instead of the magnetic field generating unit for induction heating 301 in FIG. 1. The others are similar to Example 1.

Trial Calculation of Required Ventilation Quantity

In Comparative Example 2, an air quantity required for heating is calculated on trial by the following method. A heat quantity required for heating an adsorbent is regarded as identical to Example 1 and the heat is regarded as obtained by an enthalpy difference of heated air circulating in the adsorbent between an entrance and an exit. A required air quantity calculated by this method is 60.9 g-Air/g-$CO_2$.

Table 3 shows the conditions used in the trial calculation of Comparative Example 2.

TABLE 3

Conditions used for trial calculation in Comparative Example 2

| Items | Values |
| --- | --- |
| Constant pressure specific heat of air (kJ/kg · K) | 1.07 |
| Temperature of heated air at adsorbent entrance (° C.) | 300 |
| Temperature of heated air at adsorbent exit (° C.) | 200 |

Figure 4:
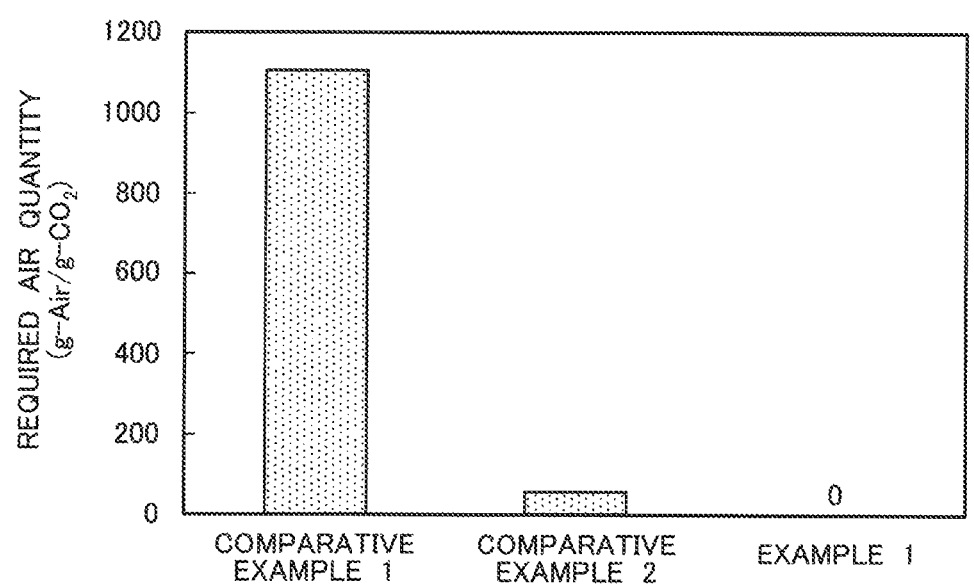
FIG. 4 is a graph comparatively showing required air quantities in Example 1 and Comparative Examples 1 and 2.

FIG. 4 is a graph comparatively showing required ventilation quantities in Comparative Examples 1 and 2 and Example 1.

In comparison with Comparative Example 1 of reducing a $CO_2$ concentration only by ventilation, the required air quantity is reduced substantially in Comparative Example 2 of using an adsorbent. Moreover, in Example 1 using induction heating, it is obvious that ventilation during heating is unnecessary theoretically and a ventilation quantity can be reduced further.

EXAMPLE 2

Figure 5:
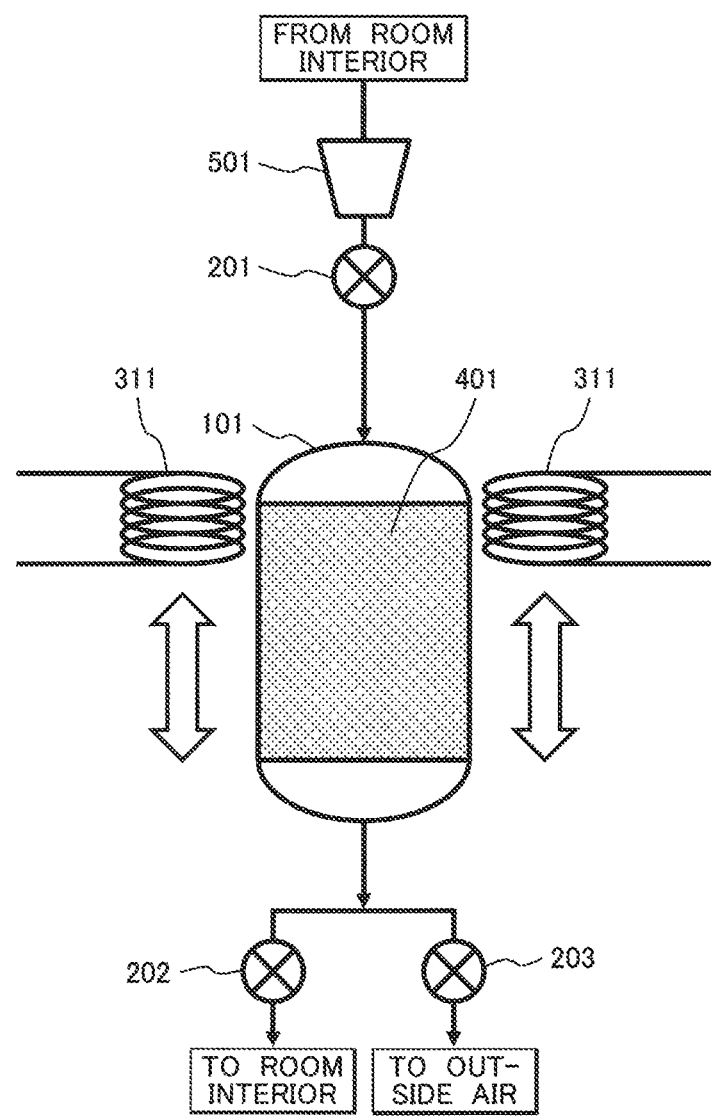
FIG. 5 is a schematic configuration diagram showing a $CO_2$ concentration reducing device (Example 2) having a movable magnetic field generating unit for an induction heating.

A configuration of arranging a magnetic field generating unit for induction heating so as to be movable in a $CO_2$ concentration reducing device for reducing a $CO_2$ concentration in indoor air by a fixed-bed method using a $CO_2$ adsorbent is shown in FIG. 5.

A $CO_2$ concentration reducing device shown in FIG. 5 includes an adsorbent container 101, flow control valves 201 to 203, a movable magnetic field generating unit for induction heating 311 having coiled conductive wires, mixed particles 401 of a $CO_2$ adsorbent including a cerium oxide and a magnetic body, and a blower 501. A material of a non-magnetic body or a non-metal such as ceramics or an organic substance is desirably used for the adsorbent container 101. The magnetic field generating unit for induction heating 311 is movable and can locally heat the magnetic body in the interior of the adsorbent container 101.

In a method for operating the device, the processes of adsorption, heating, and cooling are repeated.

Figure 6A:
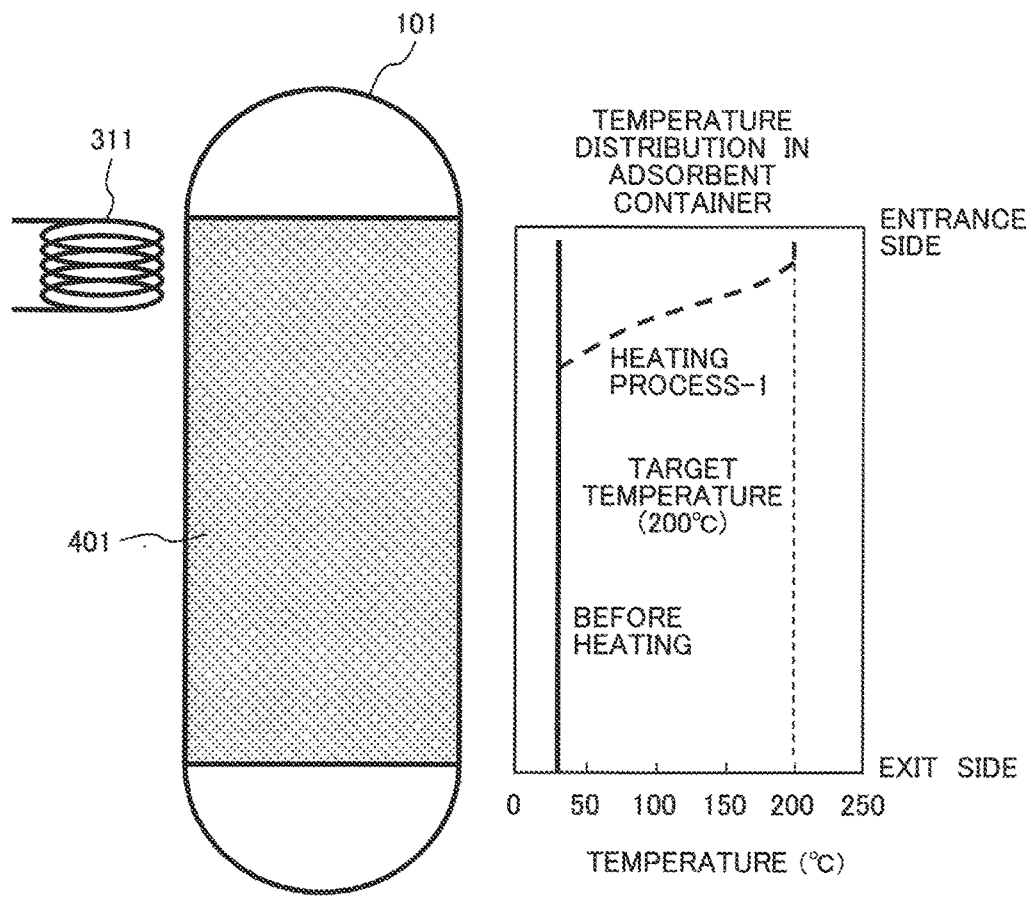
FIG. 6A is a view schematically showing an arrangement at an initial stage of a heating process and a temperature distribution in an adsorbent container according to Example 2.
Figure 6B:
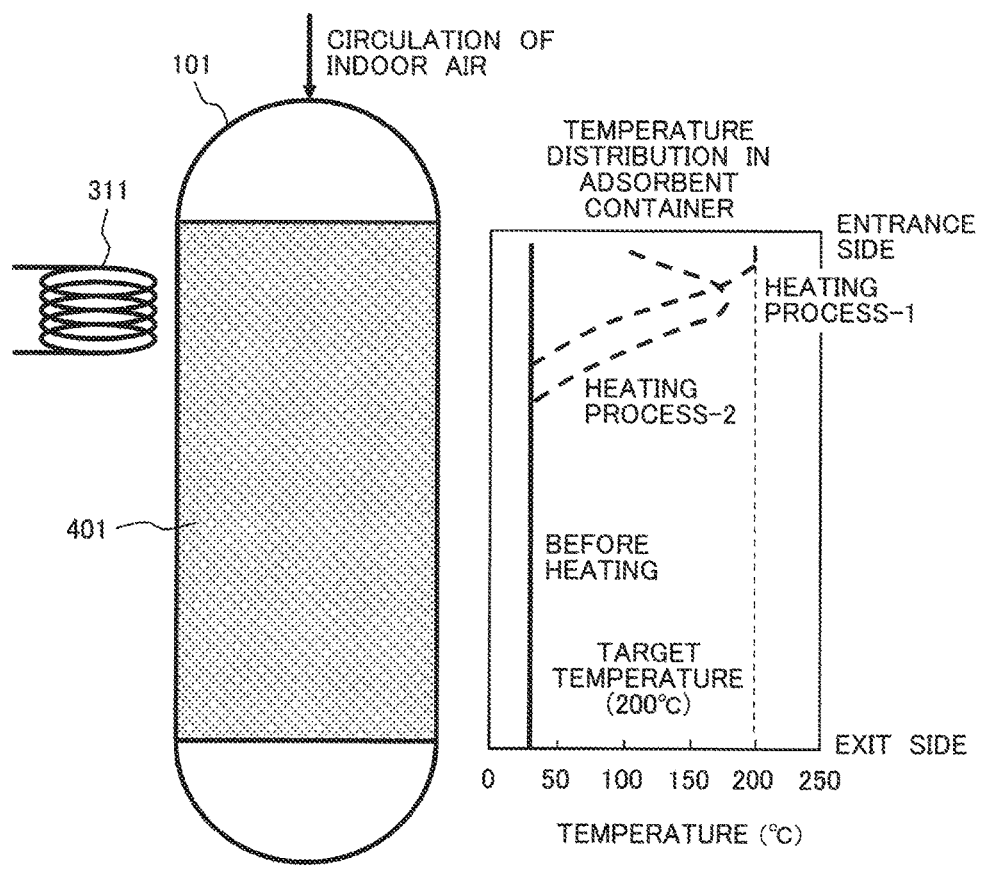
FIG. 6B is a view schematically showing a situation of advancing from the initial stage in FIG. 6A.
Figure 6C:
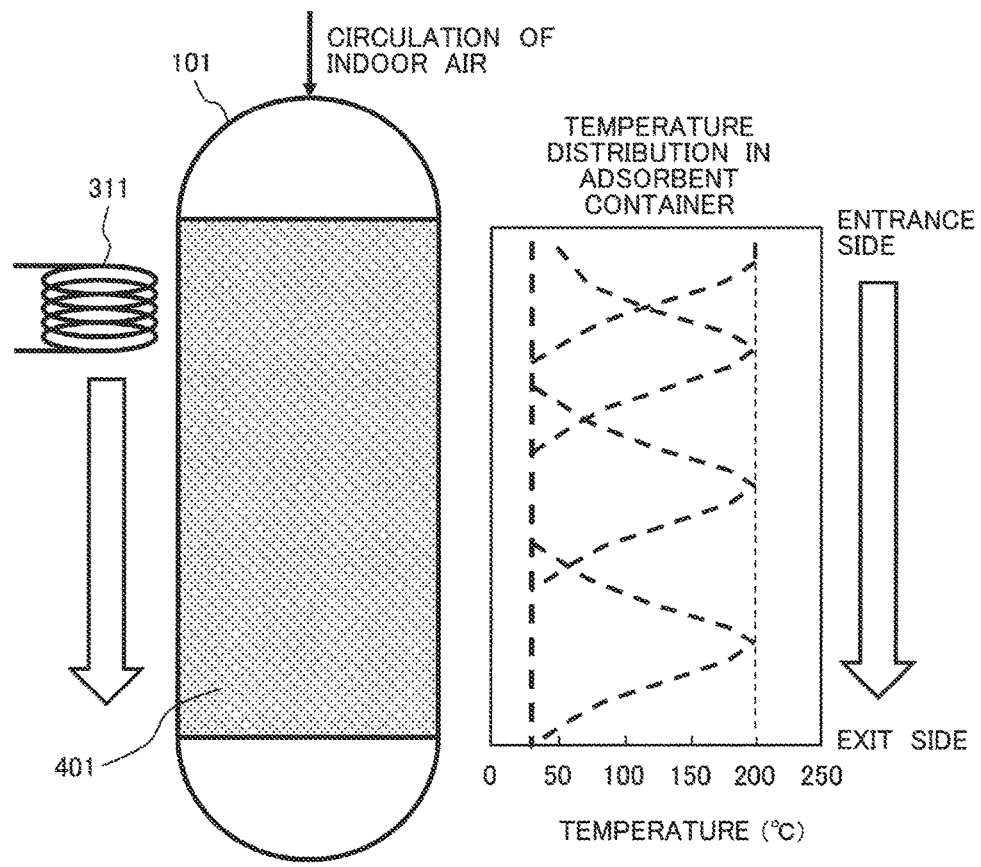
FIG. 6C is a view schematically showing a situation of advancing further from the stage in FIG. 6B.

FIGS. 6A to 6C show the state of a heating process by dividing into three stages. The $CO_2$ absorbent temperature during adsorption is set at 30° C. and the $CO_2$ absorbent temperature during desorption is set at 200° C.

FIG. 6A is a view schematically showing arrangement at an initial stage of the heating process and a temperature distribution in an adsorbent container according to Example 2. FIG. 6B is a view schematically showing the situation of advancing from the initial stage in FIG. 6A. FIG. 6C is a view schematically showing the situation of advancing further from the stage in FIG. 6B. In each of FIGS. 6A, 6B and 6C, an adsorbent container, a coil schematically representing a magnetic field generating unit for induction heating, and a graph showing the temperature in the adsorbent container are shown side by side.

In an adsorption process as a preliminary stage, the flow control valves 201 and 202 are opened and the flow control valve 203 is closed, those valves being shown in FIG. 5. $CO_2$ is adsorbed and removed by introducing indoor air into an adsorbent container 101 with a blower 501 and a gas from which $CO_2$ has been removed is returned to a room interior.

When $CO_2$ is desorbed and discharged to the atmosphere after $CO_2$ is adsorbed sufficiently, the flow control valve 202 is closed, the flow control valves 201 and 203 are opened, and mixed particles 401 are heated from the side closer to the blower 501 (entrance side) by a magnetic field generating unit for induction heating 311. The temperature of the relevant site is raised to 200° C. and $CO_2$ is desorbed. The process is referred to as heating process-1 (FIG. 6A).

Successively, indoor air is circulated in the $CO_2$ adsorbent container with the blower 501. Heat of the heated adsorbent on the blower side is transported to the exit side by the circulation of the air, the $CO_2$ adsorbent on the entrance side is cooled, and the $CO_2$ adsorbent on the exit side is heated. The process is referred to as heating process-2 (FIG. 6B).

Since the $CO_2$ adsorbent is not heated to 200° C. only by the heat transport, a heat quantity required for raising the temperature to 200° C. is generated by shifting a movable induction heating device to the exit side and applying an alternating current magnetic field. Since the $CO_2$ adsorbent is heated beforehand by the heat transport caused by air circulation, the consumption of electric power required for heating the $CO_2$ adsorbent can be reduced more than Example 1. By continuously blowing indoor air during heating and shifting the magnetic field generating unit for induction heating in response to heating, the heated part of the $CO_2$ adsorbent gradually shifts to the exit side and resultantly $CO_2$ desorbs. The process is referred to as heating process-3 (FIG. 6C).

By the method, since the $CO_2$ adsorbent is cooled from the entrance side during $CO_2$ desorption, the cooling process after $CO_2$ desorption can be shortened or discarded. When a cooling process is applied, the flow control valves 201 and 202 are opened, the flow control valve 203 is closed, indoor air is introduced into the adsorbent container 101 with the blower 501, and the mixed particles 401 are cooled.

Cases of fixing $CO_2$ adsorbent particles to a magnetic body are explained hereunder as concrete examples of a shape of a mixed particle (a composite material) of the $CO_2$ adsorbent and the magnetic body.

Figure 7:
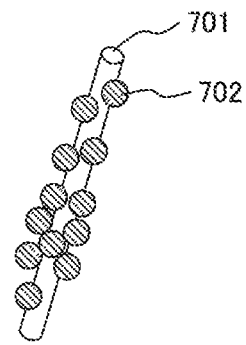
FIG. 7 is a schematic perspective view showing an example of a configuration of fixing a $CO_2$ adsorbent to a linear magnetic body.

FIG. 7 is a schematic perspective view showing an example of a configuration of fixing a $CO_2$ adsorbent to a linear magnetic body.

In FIG. 7, $CO_2$ adsorbent particles 702 are fixed to the surface of a straight linear (rod-like) magnetic body 701.

Figure 8:
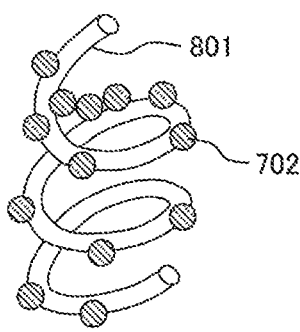
FIG. 8 a schematic perspective view showing an example of a configuration of fixing a $CO_2$ adsorbent to a spiral magnetic body.

FIG. 8 a schematic perspective view showing an example of a configuration of fixing a $CO_2$ adsorbent to a spiral magnetic body.

In FIG. 8, $CO_2$ adsorbent particles 702 are fixed to the surface of a spiral (spring-like) magnetic body 801. By forming such a shape and arranging mixed particles so as to generate a magnetic field in parallel with the center axis of the spiral, when the magnetic body 801 is formed of a metal or the like and has an electric conductivity, electric current is generated in a spiral curve formed by the magnetic body 801 and heat is likely to be generated.

Figure 9:
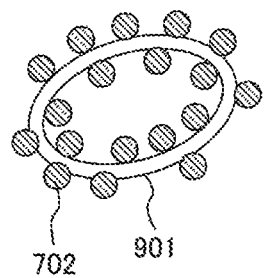
FIG. 9 is a schematic perspective view showing an example of a configuration of fixing a $CO_2$ adsorbent to an annular magnetic body.

FIG. 9 is a schematic perspective view showing an example of a configuration of fixing a $CO_2$ adsorbent to an annular magnetic body.

In FIG. 9, $CO_2$ adsorbent particles 702 are fixed to the surface of an annular magnetic body 901. By forming such a shape and arranging mixed particles so as to generate a magnetic field in parallel with the center axis of the ring, when the magnetic body 901 is formed of a metal or the like and has an electric conductivity, electric current is generated in the ring formed by the magnetic body 901 and heat is likely to be generated.

Here, the dimension of a composite material is not particularly limited and any dimension is acceptable as long as the dimension is efficient as a heating element to generate heat by induction heating or dielectric heating.

In this way, by fixing the particles of a $CO_2$ adsorbent to a magnetic body acting as a heating element, heat is likely to be transferred to the particles of the $CO_2$ adsorbent and the desorption efficiency of $CO_2$ adsorbed in the $CO_2$ adsorbent to an input energy can be increased.

Meanwhile, although the examples of arranging the coils of the magnetic field generating units for induction heating 301 and 311 over the side faces of the adsorbent containers 101 are shown in FIGS. 1, 5, and 6A to 6C, the position of an magnetic field generating unit for induction heating is not limited to the examples and a configuration of efficiently generating an alternating magnetic field at the position of a magnetic body or the like in the interior of an adsorbent container 101 is desirable. A magnetic field generating unit for induction heating therefore may be arranged so that the center axis of a coil may overlap with an adsorbent container 101 or so that the center axis of a coil may coincide with the center axis of an adsorbent container 101.

Further, in the case of dielectric heating by an alternating electric field, it is desirable to: arrange an electrode pair so as to interpose an adsorbent container 101; and form an electric field so as to penetrate a dielectric body in the interior of the adsorbent container 101 although it is not shown in the figures.

EXPLANATION OF REFERENCE NUMERALS

101: Adsorbent container,
201, 202, 203: Flow control valve,
301, 311: Magnetic field generating unit for induction heating,
401: Mixed particles of $CO_2$ adsorbent and magnetic body,
411: $CO_2$ adsorbent,
501: Blower,
601: Heater.

The invention claimed is:

1. A device for separating and removing CO2 from a gas containing CO2, the device comprising:
    a magnetic body;
    a plurality of CO2 adsorbent particles that are formed on the magnet body
    an adsorbent container which contains the magnetic body; and
    a heating unit which heats the plurality of CO2 adsorbent particles by an induction heating.

2. The device according to claim 1,
    wherein the plurality of CO2 adsorbent particles contain a cerium oxide or a cerium composite oxide.
3. The device according to claim 1,
    wherein the magnetic body has a a linear shape, a spiral shape, or an annular shape.
4. The device according to claim 1,
    wherein the magnetic body is an alloy or a chemical compound containing at least one kind selected from the group consisting of iron, chromium, and cobalt.
5. The device according to claim 1,
    wherein a binder bonds the plurality of CO2 adsorbent particles and the magnetic body.
6. The device according to claim 5,
    wherein the binder contains a silicon compound or an aluminum compound.
7. The device according to claim 1,
    wherein the heating unit is disposed outside the adsorbent container.
8. The device according to claim 1,
    wherein the heating unit can locally heat a portion of the plurality of CO2 adsorbent particles by changing a position of heating.
9. The device according to claim 1,
    wherein the plurality of CO2 adsorbent particles adsorb and desorb CO2 in a fluidized-bed style.

* * * * *